United States Patent
Kilroy et al.

(10) Patent No.: US 8,203,815 B2
(45) Date of Patent: Jun. 19, 2012

(54) SYSTEM AND METHOD TO PROVIDE TRANSIENT OVERVOLTAGE SUPPRESSION

(75) Inventors: Donald G. Kilroy, Rockford, IL (US); Scott D. Arthur, Rockford, IL (US)

(73) Assignee: Hamilton Sundstrand Corporation, Rockford, IL (US)

( * ) Notice: Subject to any disclaimer, the term of this patent is extended or adjusted under 35 U.S.C. 154(b) by 391 days.

(21) Appl. No.: 12/387,917

(22) Filed: May 8, 2009

(65) Prior Publication Data

US 2010/0284114 A1 Nov. 11, 2010

(51) Int. Cl.
*H02H 3/20* (2006.01)
*H02H 3/22* (2006.01)
(52) U.S. Cl. ........ 361/91.1; 361/111
(58) Field of Classification Search .......... 361/91.1, 361/111
See application file for complete search history.

(56) References Cited

U.S. PATENT DOCUMENTS

| 5,572,395 | A * | 11/1996 | Rasums et al. ............ 361/58 |
| 6,185,082 | B1 * | 2/2001 | Yang ............ 361/90 |
| 6,473,284 | B1 * | 10/2002 | Ilic et al. ............ 361/91.1 |
| 6,781,256 | B2 * | 8/2004 | Loechner ............ 307/46 |
| 6,856,495 | B2 * | 2/2005 | Ely ............ 361/18 |
| 7,528,609 | B2 * | 5/2009 | Savicki et al. ............ 324/508 |
| 2008/0074064 | A1 * | 3/2008 | Thomsen ............ 318/139 |

* cited by examiner

*Primary Examiner* — Jared Fureman
*Assistant Examiner* — Scott Bauer
(74) *Attorney, Agent, or Firm* — Kinney & Lange, P.A.

(57) ABSTRACT

Transient overvoltage suppression circuit prevents voltage surges from damaging an attached load. The suppression circuit includes a transistor connected in series with a low-side or return line of the load. A control circuit monitors the voltage on the input line (i.e., high-side) and in response to a detected voltage transient turns the transistor OFF to isolate the load from the transient voltage.

10 Claims, 2 Drawing Sheets

SYSTEM AND METHOD TO PROVIDE TRANSIENT OVERVOLTAGE SUPPRESSION

BACKGROUND

The present invention is related to transient voltage suppression, and in particular to a circuit topology for providing transient voltage suppression.

Transient voltage suppression is employed to prevent temporary spikes in voltage from damaging loads, such as power supplies. Various circuit topologies have been devised to provide the desired voltage suppression. For instance, in one topology a transient voltage suppression device clamps the input voltage range of the power supply to a level within the rating of the power supply. However, if the voltage suppression device fails to activate, then the load or power supply will be unprotected from transient voltage surges.

In another topology, a field effect transistor (FET) is provided in series with the input line providing power to the load (i.e., the high-side of the load, as opposed to the return line or low-side of the load). During a detected transient voltage surge, the FET is turned OFF to cause the transient voltage to be developed across the series FET. Either N-channel or P-channel FETs may be used. The drawback of an N-channel FET is that the gate voltage must be higher than the input line voltage provided at the drain of the FET. As a result, an artificially high gate voltage (i.e., voltage higher than the output voltage being supplied by the power supply) is required to operate the FET in the ON position. Typically, a charge pump and/or transformer is used to generate the gate voltage for the FET, but the conversion to alternating current for transformer operation and/or rapid switching for charge pump operation tends to generate undesirable radio frequency emissions.

Alternatively, the N-channel FET may be replaced with a P-channel FET. However, the P-channel FET is limited to circuits with relatively small power needs because of the relatively high ON resistance and associated power dissipation generated by the P-channel FET while operating in the normal ON state.

SUMMARY

A transient overvoltage protection circuit prevents transient voltages from propagating to and otherwise damaging a load. The protection circuit includes a high-side input for connection to a positive terminal of an external power source, a high-side output for connection to a positive terminal of the load, a low-side input for connection to a negative terminal of the external power source, and a low-side output for connection to a negative terminal of the load. A transistor is connected in series between the low-side input and the low-side output. A control circuit is connected to monitor the voltage at the high-side input and in response to a detected overvoltage transient turns the transistor OFF.

DETAILED DESCRIPTION

A transient voltage suppression system employs an N-channel field effect transistor (FET) connected in series with the return (i.e., low-side) of a power source. The low-side FET remains ON during normal operation, but in response to a detected high-voltage condition is turned OFF to prevent the transient voltage from propagating to the power supply.

Figure 1:
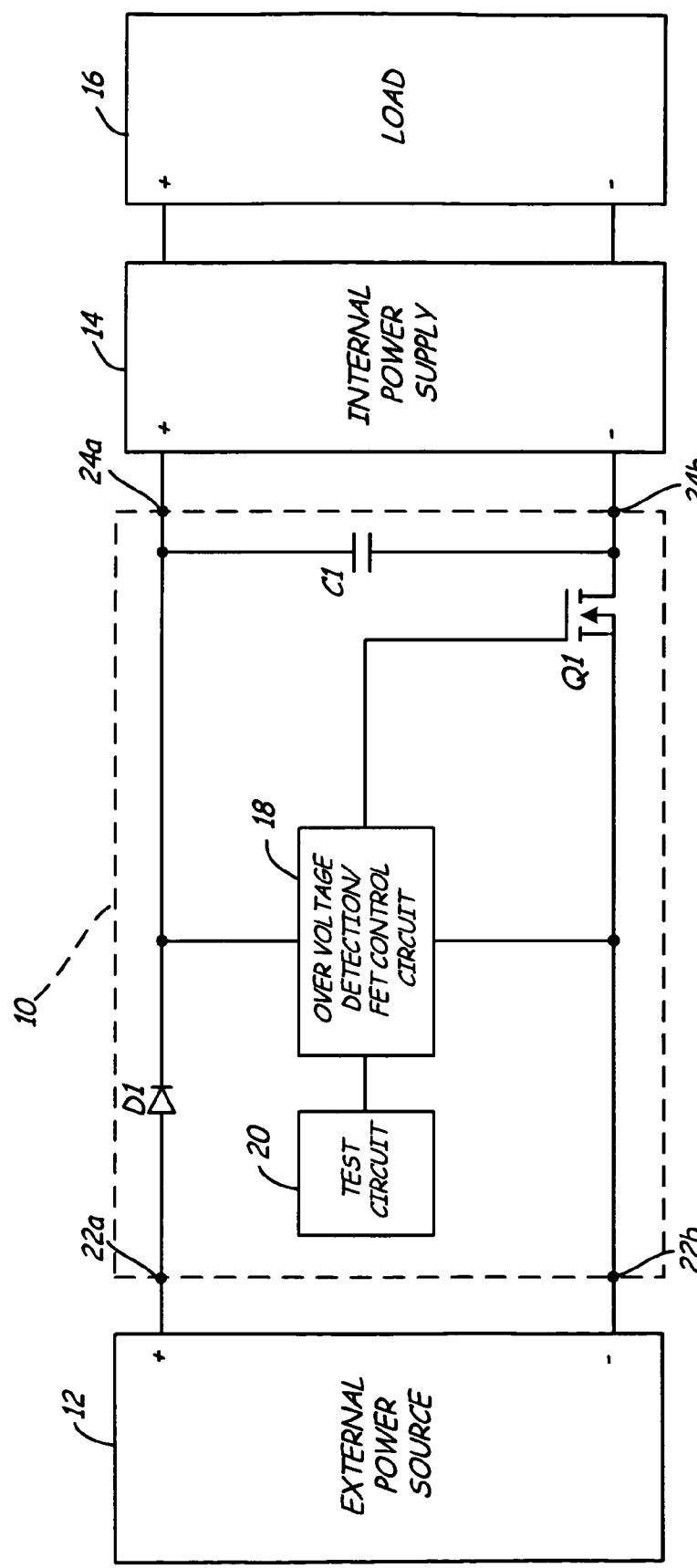
FIG. 1 is a block diagram of a transient voltage suppression system according to an embodiment of the present invention.

FIG. 1 is a block diagram of transient voltage suppression circuit 10 according to an embodiment of the present invention connected between external power source 12 and internal power supply 14, which in turn is connected to provide power to load 16. Suppression circuit 10 includes overvoltage detection logic/FET control logic (hereinafter "control logic") 18, test circuit 20, FET Q1, capacitor C1 and diode D1.

Transient voltage suppression circuit 10 includes high-side input terminal 22a for connection to the positive terminal of external power source 12 and low-side input terminal 22b for connection to the negative terminal or return of external power source 12. Suppression circuit 10 further includes high-side output terminal 24a for connection to the positive terminal of internal power supply 14 and low-side output terminal 24b for connection to the negative terminal of internal power supply 14.

In one embodiment, transient voltage suppression circuit 10 is employed on-board an aircraft in which external power source 12 provides power derived from an aircraft engine, an auxiliary power unit (APU), and/or a battery supply. In many aircraft applications, twenty-eight volt direct-current (DC) power is distributed from external power sources (such as external power source 12) to one or more loads and/or internal power supplies (such as internal power supply 14). In many aircraft applications, internal power supplies are employed to convert the power provided by an external power source (e.g., twenty-eight volts) to a voltage appropriate for consumption by a load. However, in other embodiments, power from external power source 12 is provided directly to load 16 without being converted by internal power supply 14.

Transistor Q1 is connected in series between low-side input terminal 22b and low-side output terminal 24b. As a result, transistor Q1 is connected in series between the negative terminal of external power source 12 and the negative terminal of internal power supply 14 (i.e., the return associated with external power source 12). Control logic circuit 18 is connected to monitor the voltage on high-side input terminal 22a and selectively controls the state of transistor Q1 based on the monitored voltage. Test circuit 20 is connected to provide input to control logic 18 to ensure that control logic 18 and transistor Q1 are working properly. Capacitor C1 is connected between high-side output 24a and low-side output 24b in parallel with internal power supply 14.

A transient voltage condition, such as a lightning strike, results in a sudden spike in the high-side voltage monitored by control logic circuit 18. To prevent this transient voltage from propagating to internal power supply 14, transistor Q1 is turned OFF to isolate internal power supply 14 from the transient. In particular, opening transistor Q1 creates an open-circuit condition that prevents current from propagating from high-side input 22a to the positive terminal of internal power supply 14 (as well as preventing return current from propagating from low-side input 24a back to external power source 12). Although a transient voltage exists at high-side input 22a, this transient voltage is not placed across internal power supply 14. Rather, the resulting voltage transient is placed across the drain to source of transistor Q1, which must be selected to withstand the expected voltage transient magnitude. For example, in aircraft applications in which voltage transients may be due to lightning strikes having voltage magnitudes of 500 volts or less, a 600 volt rated field effect transistor (FET) is employed to withstand the voltage transient.

In the embodiment shown in FIG. 1, capacitor C1 is connected in parallel with internal power supply 14. During normal operation, capacitor C1 is charged by power provided by via high-side input 22a. During transient conditions in which internal power supply 14 is isolated from low-side input 22b (and therefore, from external power source 12), capacitor C1 supplies power to internal power supply 14 for the duration of the transient event (typically quite short). In addition, capacitor C1 acts to prevent any sudden changes in the voltage seen by internal power supply 14, thereby protecting internal power supply 14 from the transient voltage while sourcing internal power supply 14 with any current necessary to continue operation until transistor Q1 is turned ON.

A benefit of connecting transistor Q1 (in this embodiment, an N-channel field effect transistor) on the low-side return between the negative terminals of external power source 12 and internal power supply 14 (as opposed to the high-side between the positive terminals of external power source 12 and internal power supply 14) is transistor Q1 can be operated without the need for a charge pump or transformer to boost the voltage provided at the gate of transistor Q1. For instance, if transistor Q1 were located on the high-side, turning ON transistor Q1 would require the voltage provided at the gate of transistor Q1 to be greater than the voltage provided at high-side input 22a. In a typical aircraft application, the voltage provided at high-side input 22a may be twenty-eight volts or more, which means a charge pump or transformer would be required to boost the twenty-eight volt input to a voltage sufficient to turn ON transistor Q1. In contrast, because low-side input 22b is by definition at a lower potential than high-side input 22a, the voltage required at the gate of transistor Q1 to turn the transistor ON may be derived from the input line voltage without need to boost or otherwise increase the voltage level. In addition to not requiring additional hardware to generate the boost voltage, electromagnetic interference, which is a by-product of most boosting operations, is reduced.

In addition, transient overvoltage conditions may be symmetrical, meaning that a transient overvoltage condition may result in a large positive voltage at high-side input 22a or may result in a large negative voltage at high-side input 22a. Control circuit 14 monitors the voltage at high-side input 22a for positive transients, so a large negative voltage would not be detected. However, diode D1 effectively blocks current as a result of a large negative voltage at high-side input 22a and prevents discharge of capacitor C1 that would result in shutdown of internal power supply 14. In this way, transistor Q1 provides protection for the positive transient and diode D1 provides protection for the negative transient conditions. Internal power supply 14 continues to supply power to the load and is not affected or disturbed during the lightning transients.

In this embodiment, test circuit 20 is connected to provide a test signal to control circuit 18 to ensure that control circuit 18 and transistor Q1 are working properly. Based on the result of the test, the transient overvoltage protection offered by control circuit 18 and transistor Q1 can be determined. In one embodiment, the outcome of the test is determined by monitoring the voltage across capacitor C1 (either manually or with additional hardware connected to monitor the voltage across capacitor C1). If transistor Q1 is successfully opened (i.e., turned OFF) during the test, then the voltage on capacitor C1 should decrease as internal power supply 14 draws current from capacitor C1.

Figure 2:
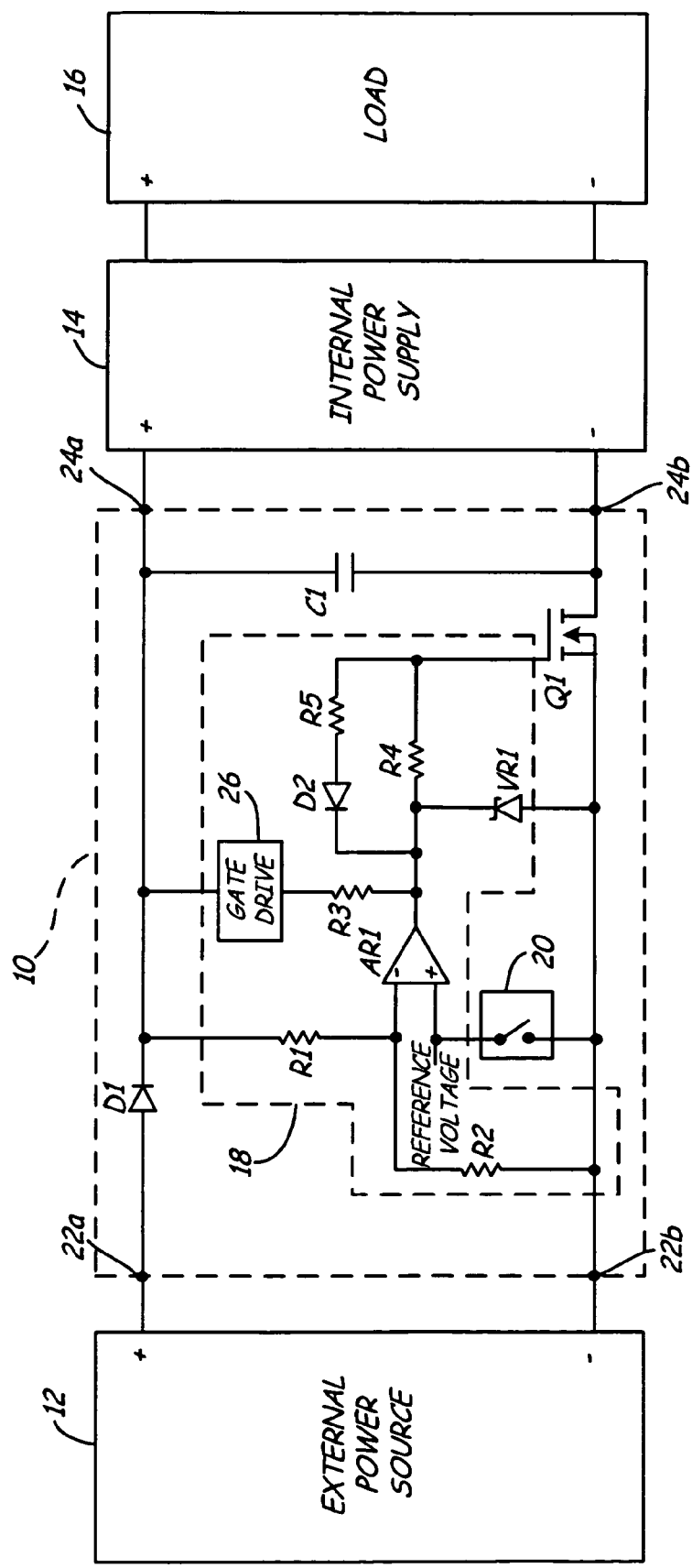
FIG. 2 is a block/circuit diagram illustrating in more detail a transient voltage suppression system according to an embodiment of the present invention.

FIG. 2 is a circuit diagram illustrating in more detail the logic employed by control circuit 18 and test circuit 20 according to an embodiment of the present invention. As shown in FIG. 2, control circuit 18 includes resistors R1, R2, R3, R4, and R5, diode D2, zener diode VR1, and comparator AR1. Test circuit 20 includes switch U1 connected between a current limited reference voltage input to comparator AR1 and low-side return 22b. As described with respect to FIG. 1, transient voltage suppression circuit 10 includes high-side input 22a and high-side output 24a for connecting the positive terminal of external power source 12 to the positive terminal of internal power supply 14. Suppression circuit 10 further includes low-side input 22b and low-side output 24b for connecting the negative terminal of external power source 12 to the negative terminal of internal power supply 14.

Resistors R1 and R2 are connected in series between the high-side input and the low-side return, acting as a voltage divider that allows control circuit 18 to monitor the magnitude of the high-side voltage provided at high-side input 22a. The divided voltage provided by resistors R1 and R2 is provided as an input to comparator AR1, which compares the divided voltage to a reference voltage to detect the presence of transient voltage spikes at high-side input 22a. If the divided voltage is less than the reference voltage (indicating normal operations), the output of comparator AR1 is open collector and is pulled up to gate drive voltage 26 via resistor R3. In one embodiment, gate drive voltage 26 is derived from high-side voltage. The gate of transistor Q1 charges up through resistors R3 and R4, turning transistor Q1 ON such that the negative terminal of internal power supply 14 is connected to the negative return of external power source 12. If the divided voltage is greater than the reference voltage (indicating a transient overvoltage condition), then the output of comparator AR1 is pulled low to ground, the gate of transistor Q1 is discharged through resistor R5 and diode D2, thereby turning transistor Q1 OFF and isolating the negative terminal of internal power supply 14 from the negative return terminal of external power source 12. Zener diode VR1 is connected between the node connected between the negative return of external power source 12 and the node connected to resistors R3, R4 and comparator AR1. Zener diode VR1 is connected to protect the gate of transistor Q1.

To test the operation of control circuit 18 and transistor Q1, switch U1 is closed to connect the reference of comparator AR1 to low-side input 22b (i.e., low voltage). As a result, the monitored voltage on high-side input 22a will appear to comparator AR1 as a transient overvoltage condition that should result in transistor Q1 being turned OFF. If closing switch U1 does not result in transistor Q1 turning OFF, then control circuit 18 and transistor Q1 are not providing voltage suppression protection to internal power supply 14. Once again, in one embodiment the successful operation of control circuit 18 and transistor Q1 is determined by monitoring (either manually or automatically) the voltage on capacitor C1, which should decrease as internal power supply 14 draws current from capacitor C1.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A transient overvoltage protection circuit for providing transient overvoltage protection, the transient overvoltage protection circuit comprising:
   a high-side input for connection to a positive terminal of an external power source;
   a high-side output for connection to a positive terminal of an internal power supply connected to supply power to a load;
   a low-side input for connection to a negative terminal of the external power source;
   a low-side output for connection to a negative terminal of the internal power supply;
   a transistor connected in series between the low-side input and the low-side output;
   a capacitor connected between the high-side output and the low-side output in parallel with the internal power supply such that when the transistor is turned OFF the capacitor supplies stored power to the internal power supply; and
   a control circuit connected to monitor voltage at the high-side input and in response to a detected overvoltage transient turns the transistor OFF to disconnect the internal power supply from the external power source, wherein the control circuit includes a voltage divider network connected between the high-side input and the low-side input for providing a divided voltage that is a function of voltage between the high-side input and the low-side input and a comparator connected to compare the divided voltage to a reference voltage, wherein an output of the comparator controls the state of the transistor.

2. The transient overvoltage protection circuit of claim 1, wherein the transistor is an N-channel field effect transistor (FET) capable of withstanding transient voltages associated with lightning strikes placed across drain and source terminals of the FET.

3. The transient overvoltage protection circuit of claim 1, wherein the capacitor is sized to supply power to the internal power supply for a duration of the overvoltage transient in which the transistor is OFF and no power is supplied to the internal power supply from the external power source.

4. The transient overvoltage protection circuit of claim 1, further including:
   a test circuit connected to provide a test signal to the control circuit to simulate a transient overvoltage condition.

5. The transient overvoltage protection circuit of claim 1, wherein the transistor includes a plurality of transistors connected in parallel with one another, each turned OFF by the control circuit in response to a detected overvoltage transient.

6. A transient overvoltage suppression system comprising:
   an internal power supply connectable to an external power source via an input line and a return line;
   a load connectable to the internal power supply;
   a capacitor connected between the input line and the return line, in parallel with the internal power supply;
   a field effect transistor (FET) connected in series on the return line; and
   a control circuit connected to monitor voltage on the input line and in response to a detected transient voltage turns the FET OFF, wherein the capacitor supplies power to the internal power supply when the FET is OFF for a duration of the transient voltage, wherein the control circuit includes a voltage divider network connected between the input line and the return line for providing a divided voltage that is a function of voltage between the input line and the return line and a comparator connected to compare the divided voltage to a reference voltage, wherein an output of the comparator controls the state of the transistor.

7. The transient voltage suppression system of claim 6, further including:
   a diode connected in series on the input line.

8. The transient voltage suppression system of claim 6, wherein the control circuit controls operation of the FET with a voltage signal that is equal to or less than the magnitude of the voltage on the input line.

9. The transient voltage suppression system of claim 6, wherein the FET is an N-channel FET capable of withstanding transient voltages associated with lightning strikes.

10. The transient voltage suppression system of claim 6, further including:
   a test circuit connected to the control circuit that provides an input to the control circuit simulating a transient voltage condition.

* * * * *